(12) United States Patent
Chino (10) Patent No.: US 8,746,775 B2
(45) Date of Patent: Jun. 10, 2014

(54) AUTOMOTIVE SUPPLEMENTARY SUN VISOR

(76) Inventor: Yoshikazu Chino, Gifu (JP)

( * ) Notice: Subject to any disclaimer, the term of this patent is extended or adjusted under 35 U.S.C. 154(b) by 0 days.

(21) Appl. No.: 13/579,003

(22) PCT Filed: Feb. 14, 2011

(86) PCT No.: PCT/JP2011/000788
§ 371 (c)(1),
(2), (4) Date: Aug. 14, 2012

(87) PCT Pub. No.: WO2011/099303
PCT Pub. Date: Aug. 18, 2011

(65) Prior Publication Data
US 2012/0313396 A1   Dec. 13, 2012

(30) Foreign Application Priority Data

Feb. 15, 2010  (JP) ................................. 2010-029758
May 20, 2010  (JP) ................................. 2010-116208

(51) Int. Cl.
*B60J 3/02*  (2006.01)
*B60J 3/06*  (2006.01)

(52) U.S. Cl.
USPC ...................... 296/97.6; 296/97.2; 296/97.7

(58) Field of Classification Search
USPC ......... 296/97.6, 97.1, 97.5, 97.8, 97.9, 97.11, 296/97.12, 97.13
See application file for complete search history.

(56) References Cited

U.S. PATENT DOCUMENTS

| | | | | |
|---|---|---|---|---|
| 4,958,879 A * | 9/1990 | Gillum | ........................ | 296/97.6 |
| 5,209,880 A * | 5/1993 | Miwa | ............................ | 264/445 |
| 5,979,967 A * | 11/1999 | Poulson | ...................... | 296/97.9 |
| 6,296,294 B1 * | 10/2001 | Kohnle et al. | ................ | 296/97.9 |
| 6,513,855 B2 * | 2/2003 | Zenisek | ....................... | 296/97.9 |
| 6,945,587 B2 * | 9/2005 | Smoot | .......................... | 296/97.9 |
| 7,014,244 B1 * | 3/2006 | Baldwin | ..................... | 296/97.9 |
| 7,540,553 B1 * | 6/2009 | Mullis | .......................... | 296/97.8 |
| 2006/0055199 A1 * | 3/2006 | Lerette | ......................... | 296/97.9 |

* cited by examiner

*Primary Examiner* — Glenn Dayoan
*Assistant Examiner* — Sunsurraye Westbrook
(74) *Attorney, Agent, or Firm* — Lowe Graham Jones PLLC (57) ABSTRACT

An automotive supplementary sun visor to shield a windshield portion around a rearview mirror between the right and left sun visors using a slit from an upper side edge of the shade plate body toward a center portion and structuring the shade plate body detachable in an attaching support shaft portion of a rearview mirror by the slit and its own flexibility. The present invention does not require a design change to an existing sun visor or rearview mirror within a passenger room or a specification change of a body construction of a motor vehicle, can be attached to a support shaft portion of the existing rearview mirror by utilizing the flexibility of the shade plate itself, and securely dims or blocks sunlight from a periphery of the rearview mirror not otherwise accounted for by existing sun visors.

9 Claims, 4 Drawing Sheets

AUTOMOTIVE SUPPLEMENTARY SUN VISOR

PRIORITY CLAIM

This invention claims priority from PCT Application Serial No. PCT/JP2011/000788 filed on Feb. 14, 2011 which claims priority to Japanese Application Serial No. 2010-029758 filed Feb. 15, 2010 and Japanese Application Serial No. 2010-116208 filed on May 20, 2010, which are hereby incorporated by reference.

FIELD OF INVENTION

The present invention relates generally to a sun visor and, more specifically, to an automotive supplementary sun visor to shield a windshield portion around a rearview mirror between the right and left sun visors.

BACKGROUND OF THE INVENTION

Since the generally used automotive sun visor is arranged in the right and left sides of the rearview mirror, it can not block a sunlight from the periphery of the rearview mirror which can not be blocked by the sun visor at a time of using the sun visor at all.

Accordingly, at a time of receiving an oblique sunlight, since the sunlight from a front face direction of a driver can be blocked by the equipped sun visor, however, the sunlight obliquely entering from the periphery of the rearview mirror can not be blocked, there is not any other way than the driver copes with it by deflecting the body so as to prevent the oblique sunlight from coming into direct contact with the eyes, and it can not be said as a comfortable and safe driving.

On the contrary, there has been in recent years proposed an accessory sun visor which is structured specially such that a light blocking range of a sun visor can be changed in its longitudinal direction as occasion demands (e.g., Japanese Unexamined Patent Publication Nos. 07-285336 and 08-080734).

Further, as a different technique from the technique mentioned above, there have been known a structure in which a sun visor which is accommodated in a ceiling portion within a passenger room of a motor vehicle, has a flexibility and is made of a plastic can be drawn out toward a windshield as occasion demands so as to be capable of blocking the light, in place of the conventional general sun visor (e.g., Japanese Unexamined Patent Publication No. 10-175433) and the like.

Further, as a similar accessory sun visor around the rearview mirror, there have been known a structure in which a part serving as an attaching and fixing means is provided independently from a body (e.g., Japanese Unexamined Utility Model Publication No. 57-094521) and the like.

However, in the proposal of the accessory sun visor which can change the light blocking range of the sun visor in its longitudinal direction as occasion demands such as disclosed in Japanese Unexamined Patent Publication Nos. 07-285336 and 08-080734 , since the former is structured such that a sun shade plate 1 is divided into a fixed plate 1a and a movable plate 1b, and a connecting plate 1c interposed between both the elements, thereby sliding the movable plate 1b on the connecting plate 1c so as to expand a light blocking range in the longitudinal direction, it is necessary to construct the sun visor as a special specification from the beginning, and it takes a lot of cost since the existing sun visor cannot be utilized. Further, since the latter is structured such that a locking pin 20 for appropriately locking an accessory visor 16 is specially provided with respect to an edge portion 15a of a sun visor 15, and the accessory visor 16 has to be provided with a locking hole 24a for inserting the locking pin 20, it is not possible to utilize the existing sun visor at all and it takes a lot of cost.

Further, since a storage case 2 is specially provided between an outer plate 5 in a roof of a motor vehicle and a ceiling plate 6 within a passenger room of the motor vehicle such as disclosed in Japanese Unexamined Patent Publication No. 10-175433, a sun visor 1 which has a flexibility and is made of a plastic is slidably stored within the case, and the sun visor 1 is structured such as to be drawn out toward a windshield 4 so as to be capable of blocking the light as occasion demands, it comes to a special structure in place of the existing sun visor, there is such a disadvantage that it is specially necessary to remodel a vehicle body, and it especially takes a lot of cost. Further, in the structure disclosed in Japanese Unexamined Utility Model Publication No. 57-094521, since a clip shaped spring bracket 1 for attaching and fixing is specially provided independently from the accessory sun visor 2, it takes a lot of cost for the structure, and the structure becomes complicated.

SUMMARY OF THE INVENTION

The present invention is directed to an automotive supplementary sun visor to shield a windshield portion around a rearview mirror between the right and left sun visors. In one embodiment, the supplementary sun visor has a shade plate body formed so as to shield a windshield portion around a rearview mirror between right and left sun visors installed within a passenger room and is flexibily structured so as to be detachable by utilizing the flexibility of a support shaft of a rearview mirror and the shade plate itself. The present invention is further directed to an automotive supplementary sun visor formed by combining the shade plate body formed to shield the rearview mirror positioned in an intermediate of the right and left sun visors installed within the passenger room and a space around the same and has a flexibility with an ornamental sheet which is formed approximately the same shape as the body, preferably has various pictures of print patterns applied onto its surface, and has a light blocking or light dimming effect, structuring such that the ornamental sheet can be appropriately replaced with respect to an accommodating portion in the shade plate body, and structuring such as to make the shade plate body detachably by utilizing the support shaft of the rearview mirror while accommodating the ornamental sheet in the shade plate body.

Accordingly, the present invention is directed to improving and solving the problem mentioned above, including to inexpensively and simply provide an automotive supplementary sun visor which does not require a design change with respect to an equipment such as the existing sun visor or rearview mirror within a passenger room, and a specification change of a body construction of a motor vehicle at all, does not require any special part for attaching and fixing, can be attached to a support shaft portion of the existing rearview mirror by utilizing its own flexibility as it is, and can securely block an intrusion of the sunlight from a periphery of the rearview mirror which cannot be blocked by the existing sun visor, or can dim the light.

In addition, the present invention inexpensively provides an automotive supplementary sun visor which is provided with various colors and patterns of ornamental sheets which can be accommodated in one shade plate body so as to be freely replaced, can be used by changing only the ornamental sheet in conformity with a feeling and a preference of the driver, and can be enjoyable in a so-called fashion sense, whereby it is possible to correspond to a wide preference.

A preferred methodology of the present invention is characterized by forming a shade plate body such a shape as to compensate between right and left sun visors equipped within a passenger room by a raw material which has an appropriate flexibility, setting a slit which has an appropriate length from an upper side edge of the shade plate body toward a center portion, and structuring the shade plate body detachable in an attaching support shaft portion of a rearview mirror by utilizing a flexibility of the slit and the shade plate itself.

In one embodiment, the shade plate body is formed by a semitransparent coloring material such a degree that a dimming effect can be obtained, such as a synthetic resin having an appropriate flexibility or the like.

In an alternative embodiment, the shade plate body is formed by a transparent material such as a synthetic resin having an appropriate flexibility or the like, and by being applied with a polarization pattern such as a parallel grid or the like for obtaining a polarization effect.

In yet an alternative embodiment, the shade plate body is formed by a transparent material such as a synthetic resin or the like having an appropriate flexibility, and being applied with various pictures and patterns for obtaining a dimming effect or a light blocking effect.

In another embodiment, the slit in the shade plate body is provided with one or a plurality of wide locking portions which can obtain the locking effect to the attaching support shaft portion of the rearview mirror.

In yet another embodiment, the present invention includes a shade plate which has an appropriate flexibility and is made of a transparent or semitransparent raw material, such a shape as to capable of compensating between right and left sun visors which are equipped within a passenger room, setting a slit which has an appropriate length, from an upper side edge of the shade plate toward a center portion, arranging a wide locking portion which can be fitted to an attaching support shaft portion of a rearview mirror in an inner end side of the slit, constructing an upper side edge releasing type shade plate body by the shade plate, arranging independently therefrom several kinds of ornamental sheets which have the same shape as the shade plate, form a slit and a locking portion in the same manner and are applied with a color and a pattern by which a light blocking or dimming effect can be obtained, making the sheets replaceable and storable one by one in the shade plate body, and structuring such that the shade plate body is detachable with respect to the attaching support shaft portion of the rearview mirror via the slit, while storing at least one selected ornamental sheet in the shade plate body.

In an alternative embodiment, the shade plate body in the present invention includes an accommodating portion of the ornamental sheet formed by laminating two shade plates which are provided with the slit and the locking portion and have the same shape, or forming the accommodating portion of the ornamental sheet by folding the shade plate which arranges two sets of slits and locking portions in a line symmetric manner and is made of a single raw material, by a line symmetrical axis.

In accordance with the present invention, as described in the first aspect, the shade plate body is formed such a shape as to compensate between the right and left sun visors equipped within the passenger room by the raw material which has the appropriate flexibility, the slit which has the appropriate length is provided from the upper side edge of the shade plate body toward the center portion, and the shade plate body is structured such as to be detachable in the support shaft of the existing rearview mirror within the passenger room, by utilizing the flexibility of the slit and the shade plate itself. Accordingly, it is not necessary to set the equipment (the sun visor, the rearview mirror and the like) within the passenger room to the special specification or apply a design change at all, it is possible to easily and freely attach and detach the shade plate body to and from the attaching support shaft of the existing rearview mirror as occasion demands, by utilizing its own flexibility and the slit, it is possible to securely block the intrusion of the sunlight from the periphery of the rearview mirror which can not be blocked by the existing sun visor when it is attached, it is possible to provide a comfortable and safe driving environment, and any special part for attaching and fixing is not necessary at all. Therefore, it is possible to obtain a great actual effect such that it becomes inexpensive and simple, or the like.

Further, as described in the second aspect, the shade plate body in accordance with the present invention is formed by the semitransparent coloring material such a degree that the dimming effect can be obtained, such as the synthetic resin having the appropriate flexibility or the like. Accordingly, it is possible to securely dim the sunlight which enters from the periphery of the rearview mirror which can not be blocked by the existing sun visor, and there can be achieved an excellent effect that it is possible to obtain the dimming of the sunlight without deteriorating the field of view of the driver, it is possible to inexpensively provide the comfortable and safe driving environment and simply keep it.

Further, as described in the third aspect, the shade plate body is formed by the transparent material such as the synthetic resin having the appropriate flexibility or the like, and by being applied with the polarization pattern, for example, the parallel grid or the like for obtaining the polarization effect. Accordingly, it is possible to securely polarize the sunlight which can not be blocked by the existing sun visor and enters from the periphery of the rearview mirror, by the polarization pattern serving as a polarization filter, it is possible to inexpensively provide the comfortable and safe driving environment while achieving the dimming of the sunlight without deteriorating the field of view of the driver at all, and it is possible to obtain such an effect that the driver can recognize a color of a traffic signal or the like as it is.

In addition, as described in the fourth aspect, the shade plate body is formed by the material such as the synthetic resin or the like having the appropriate flexibility, and the pictures and patterns, for example, a plurality of flowering grasses, animals, geometrical patterns or the like for obtaining the dimming effect or the light blocking effect are applied to the surface thereof. Accordingly, it is possible to block or dim the sunlight which can not be blocked by the existing sun visor and enters from the periphery of the rearview mirror, and it is also possible to obtain a fashion property and a healing effect such as a gentle for eyes of the driver by the pictures and patterns.

Further, as described in the fifth aspect, the slit in the shade plate body is only pierced with one or a plurality of wide locking portions which can obtain the locking effect to the attaching support shaft of the rearview mirror. Accordingly, it is possible to securely achieve the positioning and the locking fixation by fitting the locking portion to the support shaft of the rearview mirror, while being a simple structure, it is possible to adjust an attached position and state of the shade plate in conformity with a vehicle by selecting an appropriate one from a plurality of locking portions in conformity with a position and a thickness of the support shaft of the rearview mirror, and it is possible to be utilized for various vehicles so as to be extremely convenient.

In addition, in the supplementary sun visor in accordance with the present invention, since the effect of blocking or dimming the sunlight entering from the periphery of the rearview mirror is extremely great while its structure being extremely simple, and it is not necessary to independently provide a part for attaching and fixing, it is possible to make the structure simple at that degree so as to provide the excellent effect inexpensively.

Further, in accordance with the present invention, as described in the sixth aspect, the present invention relates to the automotive supplementary sun visor characterized by forming the shade plate which has the appropriate flexibility and is made of the transparent or semitransparent raw material, such a shape as to capable of compensating between the right and left sun visors which are equipped within the passenger room, setting the slit which has the appropriate length, from the upper side edge of the shade plate toward the center portion, arranging the wide locking portion which can be fitted to the attaching support shaft portion of the rearview mirror in the inner end side of the slit, constructing the upper side edge releasing type shade plate body by the shade plate, arranging independently therefrom several kinds of ornamental sheets which have the same shape as the shade plate, form the slit and the locking portion in the same manner and are applied with the color and the pattern by which the light blocking or dimming effect can be obtained, making the sheets replaceable and storable at least one by one in the shade plate body, and structuring such that the shade plate body is detachable with respect to the attaching support shaft of the rearview mirror via the slit, while storing the selected ornamental sheet in the shade plate body.

Further, the shade plate body is formed by the raw material which has the appropriate flexibility and transparency, and the shade plate body is structured such as to be detachable to the support shaft of the existing rearview mirror within the passenger room via the slit in a state of accommodating the selected at least one ornamental sheet. Accordingly, it is not necessary to set the equipment (the sun visor, the rearview mirror and the like) within the passenger room to the special specification or apply a design change at all, it is possible to easily and freely attach and detach the shade plate body as occasion demands, by utilizing the attaching support shaft of the existing rearview mirror as it is, it is possible to securely block the intrusion of the sunlight from the periphery of the rearview mirror which can not be blocked by the existing sun visor when it is attached, it is possible to provide a comfortable and safe driving environment, and it is possible to economically obtain a great actual effect since it can be inexpensively and simply achieved.

Further, the supplementary sun visor in accordance with the present invention is structured such that the ornamental sheet which is formed approximately the same shape as the shade plate body, has the various pictures of print patterns applied to the surface thereof and has the light blocking or dimming effect is replaceable in the accommodating portion which is formed in the shade plate body. Accordingly, it is possible to prepare several kinds of ornamental sheets with respect to one shade plate body, whereby it is possible to freely replace and use the ornamental sheet depending on the preference of the driver and the feeling at that time, it is possible to correspond to a wide preference, and it is possible to obtain the light blocking effect economically inexpensively and pleasantly.

Further, as described in the seventh aspect, the shade plate constructing the shade plate body of the supplementary sun visor in accordance with the present invention is structured such as to be provided in the shade plate constructed by one raw material having the appropriate flexibility and transparency in such a manner that two sets of slits and the locking portion become line symmetrical, and form the accommodating portion of the ornamental sheet by folding the slit and the locking portion by the line symmetrical axis in such a manner as to laminate them. It is possible to accommodate and retain the ornamental sheet without using any adhesive agent or the like for forming the shade plate body and the accommodating portion, it is also possible to achieve a reduction of the manufacturing steps and a cost, and an actual effect is great.

In addition, in the supplementary sun visor in accordance with the present invention, the effect of blocking or dimming the sunlight entering from the periphery of the rearview mirror is extremely great while the structure thereof being extremely simple, and it is possible to provide an excellent effect inexpensively and in a multipurpose manner.

DETAILED DESCRIPTION OF THE PREFERRED EMBODIMENT (Embodiment 1)

Figure 1:
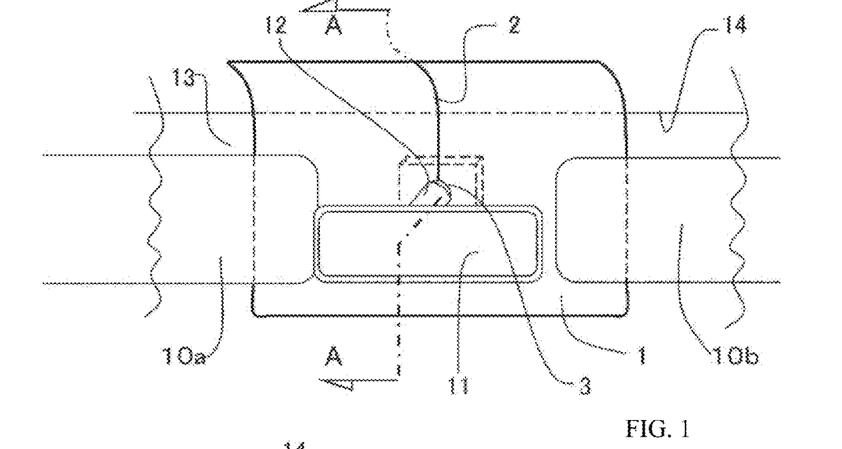
FIG. 1 is an explanatory front elevational view showing an attached state of a supplementary sun visor as seen from a driver side of a motor vehicle in an embodiment in accordance with the present invention.

A description will be given below of the present invention on the basis of an embodiment shown in the drawings. FIG. 1 is a front elevational view showing an attached state of a supplementary sun visor in an embodiment.

Figure 2:
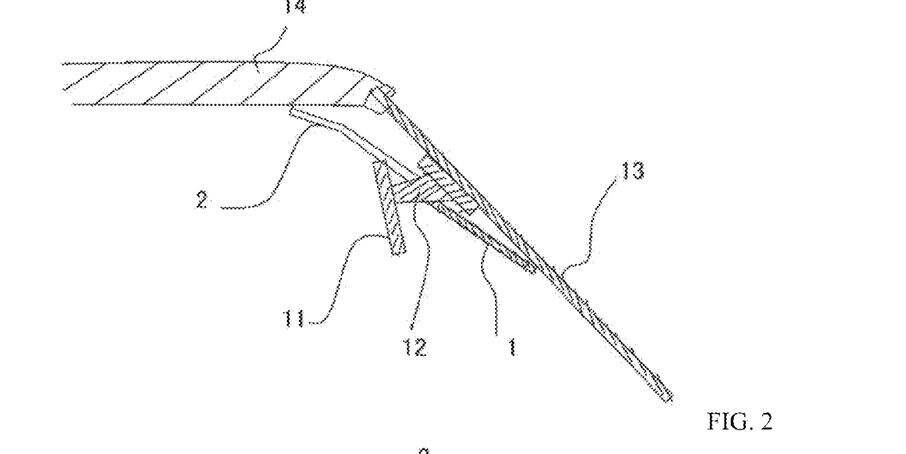
FIG. 2 is an explanatory cross sectional view from a direction of a line A-A along a support axis of a rearview mirror in the embodiment in FIG. 1 in accordance with the present invention.
Figure 3:
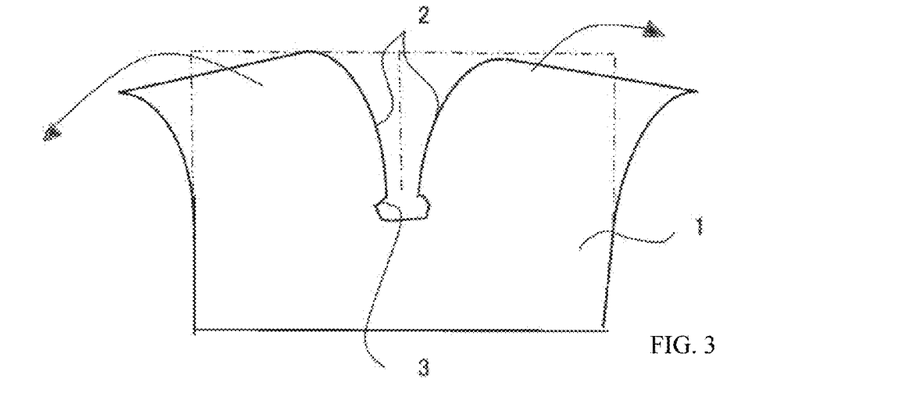
FIG. 3 is an explanatory view showing an attaching and detaching way of a shade plate body in accordance with the present invention.

FIG. 2 is an explanatory cross sectional view as seen from a direction of a line A-A along a support shaft of a rearview mirror in the embodiment in FIG. 1, and FIG. 3 is an explanatory view showing an attaching and detaching way of a shade plate body.

Figure 4:
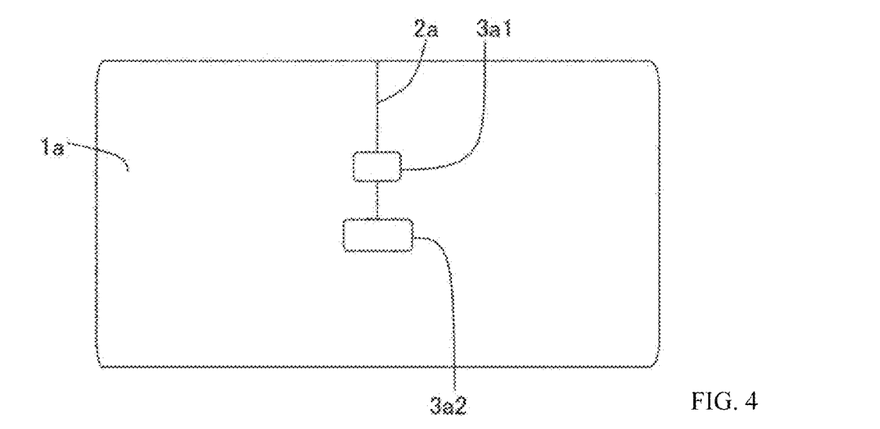
FIG. 4 is an explanatory view showing a shade plate body in another embodiment.
Figure 5:
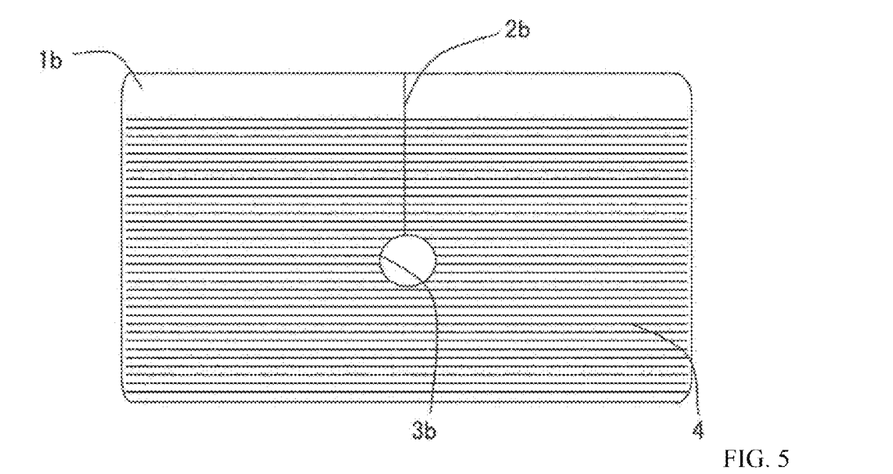
FIG. 5 is an explanatory view showing another embodiment of the shade plate body in accordance with the present invention.

FIG. 4 is an explanatory view showing a concrete example in the case that a plurality of locking portions in the supplementary sun visor are provided as another embodiment, and FIG. 5 is an explanatory view showing an embodiment of a polarization plate type as yet further embodiment in the supplementary sun visor in accordance with the present invention.

As shown in FIG. 1, the supplementary sun visor in the embodiment is constructed by a shade plate body which is made of a raw material having an appropriate flexibility, and a slit portion which has an appropriate length from an upper side edge of the shade plate body toward a center portion.

A description will be given below in detail. A rearview mirror 11 is attached and fixed to a windshield 13 or a ceiling portion 14 of a vehicle body within a passenger room of a motor vehicle (in the embodiment in FIG. 1, there is shown a case of being fixed to the windshield 13 side) via a support shaft 12, and a pair of sun visors 10a and 10b are normally equipped in left and right sides of the rearview mirror 11. However, since there is no means for shielding a periphery of the rearview mirror 11 even in a used state of the sun visors 10a and 10b, in this state, an oblique sunlight particularly enters from a spaced portion which is not blocked and is dazzling.

The present invention is structured such that a shade plate body 1 is formed by a raw material which has an appropriate flexibility, as such a shape that can compensate the spaced portion around the rearview mirror 11 so as to block the sunlight (that is, normally formed as a rectangular shape preferably, however, may be formed as the other shapes such as a trapezoidal shape and an oval shape, without being limited to the rectangular shape), a slit 2 having an appropriate length is provided from an upper side edge thereof toward a center portion, and the shade plate body 1 can be attached to and detached from the support shaft 12 of the rearview mirror 11 within the passenger room via the slit 2 by utilizing its own flexibility. Accordingly, it is possible to bring any upper or lower side edge of the shade plate body 1 into contact with the ceiling portion 14 or the windshield 13 of the motor vehicle around the support shaft portion 12 serving as a supporting point as shown in FIG. 2 so as to elastically deflect and easily attach the shade plate body 1, by engaging a wide locking portion 3 in an end portion with the support shaft 12 which supports the existing rearview mirror 11 via the slit 2, and it is possible to securely attach and fix the shade plate body 1 by means of the locking portion 3 which is pierced in the shade plate body itself, whereby it is possible to securely prevent an intrusion of the sunlight in a gap portion around the rearview mirror 11 which can not be previously covered by the left and right sun visors 10a and 10b.

At a time of attaching the shade plate body 1, an opening width of the slit 2 is widened to the same level as a diameter of the support shaft 12 by twisting right and left sides of an upper side edge on the boundary of the slit 2 in an opposite direction to each other as shown in FIG. 3, and the locking portion 3 is fitted to the support shaft 12 so as to be easily attached.

Further, it goes without saying that the shade plate body 1 can be easily detached from the support shaft 12 of the rearview mirror 11 via the slit 2 by twisting the right and left sides or any one thereof in the upper side edge of the shade plate body 1 in the same manner as the attaching time, in a direction having a freedom of bowing down, at a time when the shade plate body 1 is not necessary. In this case, if permissible, it may be kept being attached, and is not inconvenient in driving.

(Embodiment 2)

Further, a description will be given of another embodiment in accordance with the present invention with reference to FIG. 4.

A shade plate body 1a in this case is structured such that a plurality of wide locking portions 3a1 and 3a2 are provided in a midstream and a leading end portion of a slit 2a. In other words, since an attached condition of the rearview mirror 11 is different depending on the kind of the motor vehicle, a distance between the rearview mirror 11 and the ceiling portion 14 is not fixed. Accordingly, it is possible to select any one of the locking portions 3a1 and 3a2 so as to make it engage with the support shaft 12 of the rearview mirror 11.

In this case, since it is possible to engage with the support shaft 12 of the rearview mirror 11 so as to correspond by selecting the former locking portion 3a1 in the case of a vehicle in which the distance from the ceiling portion 14 is narrow, and on the other hand selecting the latter locking portion 3a2 in the case of a vehicle in which the distance from the ceiling portion 14 is wide, it is possible to adjust to the various vehicles without being limited to the kind of the motor vehicle so as to become extremely convenient, and it is possible to securely attach the shade plate body 1a by these locking portions 3a1 and 3a2.

Further, referring to the raw material of the shade plate bodies 1 and 1a in accordance with the present invention, it is not limited to a light blocking system by a material which does not have any light permeability at all, as long as the raw material has such an appropriate flexibility as to be convenient for attaching and detaching. For example, it is possible to employ a semitransparent raw material which has a light dimming effect such a degree that is not dazzling or it is possible to employ a dimming system by a colored semitransparent raw material as long as it is not dazzling. Further, the color in the colored case is not particularly specified.

(Embodiment 3)

Subsequently, a description will be given of another embodiment with regard to the raw material of the shade plate bodies 1 and 1a in accordance with the present invention with reference to FIG. 5. First of all, as long as the raw material has such an appropriate flexibility as to be convenient for attaching and detaching, it is possible to execute in the case of a transparent raw material which has no light blocking or dimming effect, as is different from the preceding embodiment.

In other words, a shade plate body 1b in the case of the embodiment is formed by a transparent raw material which has a flexibility, and is provided on a surface thereof with a polarization pattern 4 such as a parallel grid or the like (in this connection, the polarization pattern 4 is not limited to the parallel grid as long as a polarization effect can be obtained, but can employ a mesh or a dot pattern), thereby obtaining a polarization filter effect and polarizing the sunlight so as to prevent the driver from being dazzling.

Structures in connection with a slit 2b and a locking portion 3b in this case can employ by optionally selecting and combining any of the embodiments mentioned above, and as an advantage of the polarization system case, it is possible to obtain the dimming effect under a color having no uncomfortable feeling such as a traffic signal or the like in comparison with the case of the semitransparent colored shade plate.

(Embodiment 4)

Further, a description will be given of the other embodiment with regard to the raw material of the shade plate bodies 1 and 1a in accordance with the present invention with reference to FIG. 6.

First of all, as long as the raw material has such an appropriate flexibility as to be convenient for attaching and detaching, the shade plate body 1c can be executed by the case of a transparent raw material which has no light blocking effect and without depending on the polarization system, in the same manner as the embodiment 3 in FIG. 5.

In other words, a shade plate body 1c in the case of the embodiment is formed by a transparent raw material which has a flexibility, and is provided on a surface thereof with a print pattern 5, for example, flowering grasses, animals, geometrical patterns or the like, having the light blocking or dimming effect, thereby blocking or dimming the sunlight by means of the print pattern 5 so as to prevent the driver from being dazzling. Reference numeral 2c in the drawing denotes the same slit as the other embodiments, and reference numeral 3c denotes a wide locking portion in the same manner.

Accordingly, in the case of this embodiment 4, in addition to the original effect of the shade plate body 1c, a healing effect can be additionally obtained since a green color has an eye fatigue preventing effect or the like, together with a fashion property.

In this case, the description is given of the embodiments which are different in the raw material of the shade plate body constructing the supplementary sun visor in accordance with the present invention, the shape of the locking portion, and the light blocking system and the dimming system of the sunlight, however, which of the shape and the raw material of the shade plate body, the locking portion and its fitted and attached state, the light blocking system and the dimming system, or the pictures of the print pattern is employed is not limited to the illustrated embodiment, but they may be variously combined so as to be executed. In any cases, as long as the raw material has the appropriate flexibility, it is possible to achieve an excellent effect of the present invention without damaging regardless of the attached state.

(Embodiment 5)

In the embodiment mentioned above, in order to change the material, the color or the pattern of the shade plate body itself, it is necessary to prepare the different colors and patterns which are constructed individually in each case. In other words, in the case of intending to change the color and the pattern depending on the feeling and the preference of the driver, it is necessary to prepare the shade plate bodies themselves having the various colors and patterns, and it is necessary to replace the shade plate body itself depending on the case so as to use. Accordingly, it takes a lot of cost.

Accordingly, the invention in accordance with the fifth embodiment is created for solving the problem mentioned above, and an object thereof is to inexpensively provide an automotive supplementary sun visor which does not require a design change with respect to an equipment such as the existing sun visor, rearview mirror or the like in the passenger room, and a specification change of the body structure of the motor vehicle, can securely block or dim the intrusion of the sunlight from the periphery of the rearview mirror which cannot be blocked by the existing sun visor, by utilizing the support shaft portion of existing rearview mirror as it is, can be provided with an ornamental sheet having various colors and patterns which can be accommodated in one shade plate body so as to be replaceable, thereby replacing and using only the ornamental sheet at each time depending on the feeling and the preference of the driver, and can enjoy in a so-called fashion sense, thereby corresponding to a wide preference.

In this case, the description is given of the embodiments which are different in the raw material of the shade plate body constructing the supplementary sun visor in accordance with the present invention, the shape of the locking portion, and the light blocking system and the dimming system of the sunlight, however, which of the shape and the raw material of the shade plate body, the locking portion and the light blocking system and the dimming system, or the pictures of the print pattern is employed is not limited to the illustrated embodiment, but they may be variously combined so as to be executed. In any cases, as long as the raw material has the appropriate flexibility, it is possible to achieve an excellent effect of the present invention without damaging.

(Embodiment 6)

Figure 7:
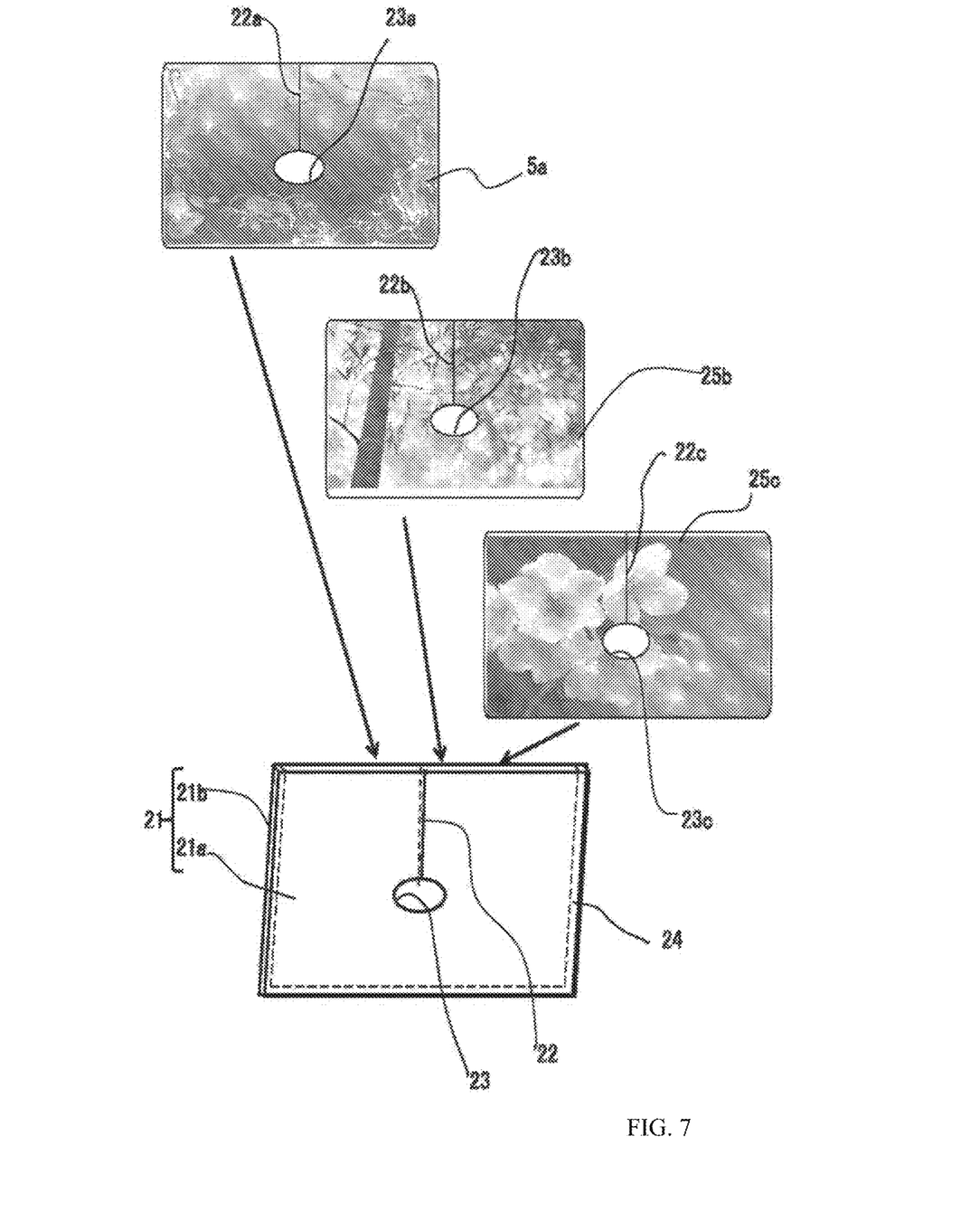
FIG. 7 is an expansion perspective view explaining a structure of a supplementary sun visor in an embodiment in accordance with the present invention.

FIG. 7 is an expansion perspective view describing a structure of a supplementary sun visor in accordance with an embodiment. In this case, in the supplementary sun visor in accordance with the present embodiment 6, a description of the common structures with the supplementary sun visors in accordance with the embodiments 1 to 5 will not be repeated.

As shown in FIG. 7, in the supplementary sun visor in accordance with an embodiment, a shade plate body 21 is constructed by two shade plates 21a and 21b which have an appropriate flexibility and are made of a transparent or semi-transparent raw material, a slit 22 having an appropriate length is provided from an upper side edge of the shade plate body 21 toward a center portion, a wide locking portion 23 is provided in an inner end thereof, and an accommodating portion of the shade plate body 21 is provided independently with ornamental sheets 25a, 25b and 25c in which flowering grasses, animals or the other geometrical patterns are applied to a surface of a raw material, for example, a colored synthetic resin raw material or a paper having a light blocking or dimming effect.

Figure 6:
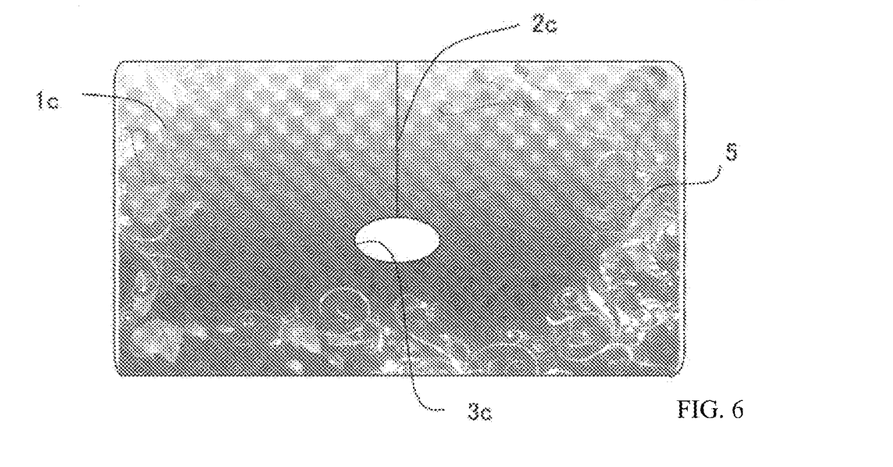
FIG. 6 is an explanatory view showing an embodiment of a shade plate body having a fashion property in accordance with the present invention.

The attaching and detaching ways are approximately the same as the embodiment 1, the shade plate body 1, the slit 2 and the locking portion 3 in FIGS. 1 to 3 correspond to the shade plate body 21, the slit 22 and the locking portion 23 in FIG. 6. The present invention has an appropriate flexibility in such a shape that can compensate a spaced portion around the rearview mirror 11 so as to block the sunlight (that is, a rectangular shape is normally preferable, however, may be formed as a trapezoidal shape, an oval shape or the other shapes without being limited to the rectangular shape), and the shade plate body 21 is formed by a transparent or semi-transparent raw material, however, the shade plate body 21 is integrated by superposing two shade plates 21a and 21b formed as the same shape and bonding three sides except an upper side edge by means of an adhesive agent 24 or the like, and forms an accommodating portion which selectively accommodates any one of the ornamental sheets 25a, 25b and 25c between the shade plates. The shade plates 21a and 21b are provided with a slit portion 22 having an appropriate length from an upper side edge toward a center portion, and the shade plate body 21 is structured such as to be detachable with respect to the support shaft 12 of the rearview mirror 11 in the passenger room via the slit portion 22. Accordingly, it is possible to bring upper and lower side edges of the shade plate body 21 into contact with the ceiling portion 14 and the windshield 13 (or any one of them) of the motor vehicle around the support shaft portion 12 serving as a supporting point in the same manner as FIG. 2, by engaging a wide locking portion 23 in an end portion with the support shaft 12 supporting the existing rearview mirror 11 via the slit 22, thereby elastically bowing down the shade plate body 21 so as to easily attach. Further, it is possible to securely attach the shade plate body 21 to the locking portion 23, whereby it is possible to securely prevent the intrusion of the sunlight in the gap portion around the rearview mirror 11 which can not be previously covered by the left and right sun visors 10a and 10b.

Further, the ornamental sheets 25a, 25b and 25c constructing the supplementary sun visor in accordance with the present invention is formed, for example, approximately as the same shape as the shade plates 21a and 21b which construct the shade plate body 21, and are structured such that flowers, plants and animals, or geometrical patterns are applied to a colored material which is a synthetic resin raw material or a paper product having an appropriate flexibility (being thin or inexpensive) in the same manner, and achieves the light blocking or dimming effect by itself, or a sheet surface, and slits 22a, 22b and 22c and locking portions 23a, 23b and 23c are provided in the same manner.

In other words, any one of the ornamental sheets 25a, 25b and 25c is appropriately selected depending on the preference of the driver and the feeling at each time, and is inserted and accommodated in the accommodating portion of the shade plate body 21 in such a manner that the slit 22 and the slit 22a or 22b or 22c correspond, and the locking portion 23 and the locking portion 23a or 23b or 23b correspond respectively, and they are integrally attached to the support shaft 12 of the rearview mirror 11 as mentioned above. In the case that it is intended to change the ornamental sheet 25a, 25b or 25c, after it is temporarily detached from the support shaft 12 integrally with the shade plate body 21 in accordance with the way shown in FIG. 2 mentioned above, is recombined with ornamental sheet 25a or 25b or 25c to be used, can be reattached to the support shaft 12 of the rearview mirror 11, and can be easily changed.

In this case, in the shade plate body 21 in accordance with the present invention, in order to make the colors and the patterns of the various ornamental sheets 25a, 25b and 25c see through, the raw material is preferably transparent or semitransparent as long as the raw material has such an appropriate flexibility as to be convenient for attaching and detaching, and the raw material of the ornamental sheets 25a, 25b and 25c is not limited to that having no light permeability, but may employ, for example, a semitransparent raw material having such a light dimming effect as not to be dazzling, or a combination thereof, and may further employ a colored semitransparent raw material as long as it is not dazzling. The colors and the patterns are not particularly specified.
(Embodiment 7)

Figure 8:
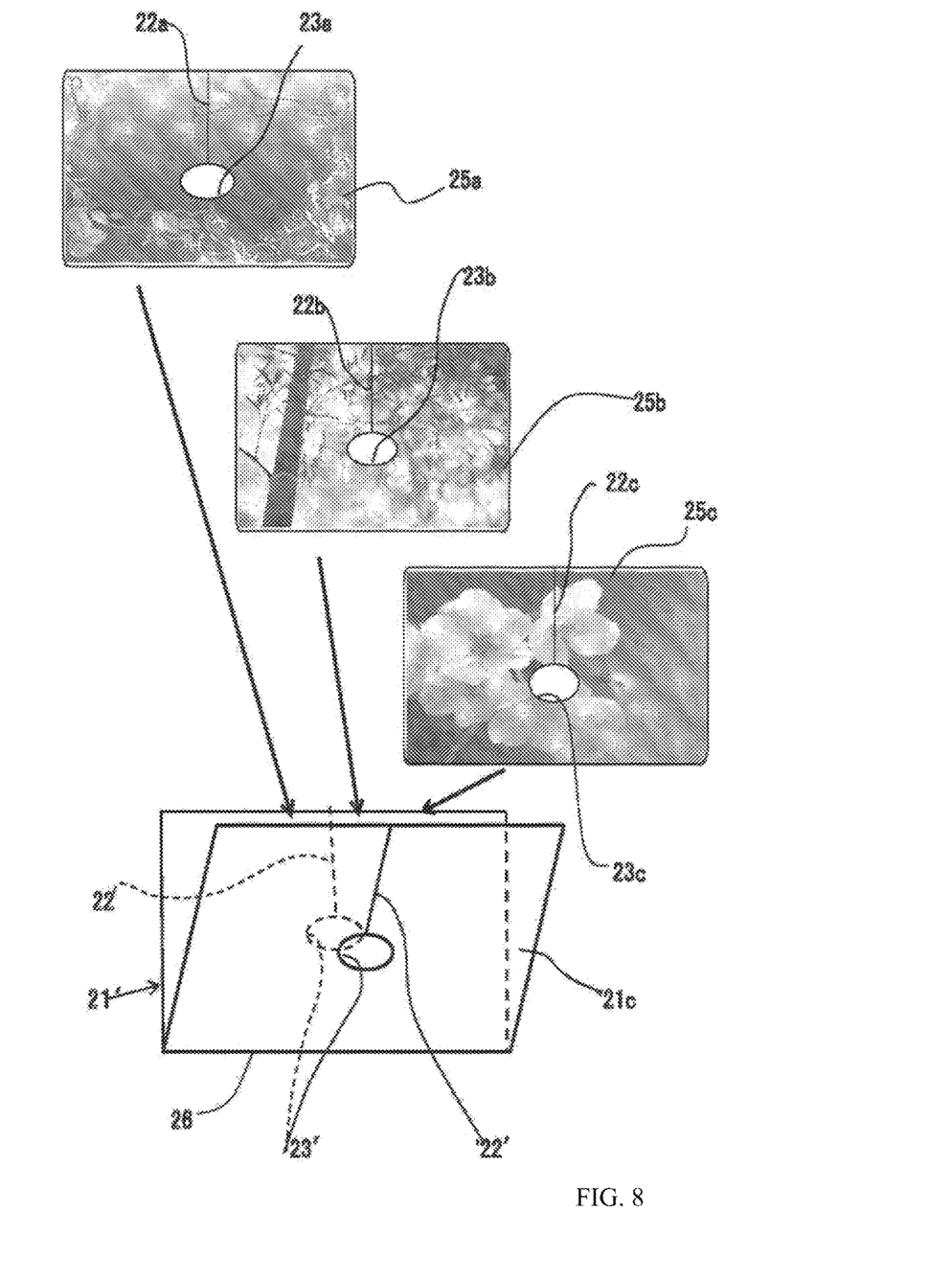
FIG. 8 is a perspective view explaining a structure of a supplementary sun visor in another embodiment in accordance with the present invention.

Subsequently, a description will be given of the other embodiment of the supplementary visor in accordance with the present invention with reference to FIG. 8.

In this case, the previous shade plate body 21 is constructed by two shade plates 21a and 21b. On the contrary, this shade plate body is constructed by a single raw material having an appropriate flexibility.

In other words, a shade plate body 21' in the case of this embodiment is structured such that a center line which divides a shade plate 21c made of a single raw material of a magnitude corresponding to two shade plates 21a and 21b into two equal parts is set to a line symmetrical axis 26, and the shade plate 21c is folded at a portion of the line symmetrical axis 26, whereby the ornamental sheets 25a, 25b and 25c can be accommodated so as to be appropriately replaceable therebetween.

Accordingly, it is possible for the driver to appropriately select at least any one of the ornamental sheets 25a, 25b and 25c depending on the preference and the feeling at each time in accordance with the fashion sense, it is possible to pinch it between two-folded portion of the shade plate 21c so as to accommodate, it is possible to set in such a manner that the slit 22' and the slit 22a or 22b or 22c correspond, and the locking portion 23' and the locking portion 23a or 23b or 23c correspond respectively, and it is possible to easily attach them to the support shaft 12 of the rearview mirror 11 integrally as mentioned above.

Further, in the shade plate body 21', since any means such as an adhesive agent for forming the accommodating portion of the ornamental sheets 25a, 25b and 25c is not necessary at all, it is possible to widely reduced a manufacturing cost and a man hour at that degree, and it is possible to inexpensively provide the supplementary sun visor.

In this case, the description is given of the preferable embodiments of the raw material of the shade plate body constructing the supplementary sun visor in accordance with the present invention, the raw material, the color and the surface pattern of the ornamental sheet, and the shape of the locking portion and the like, however, the shape, the raw material and the structure of the shade plate body, the raw material, the color and the surface pattern of the ornamental sheet, the shape of the locking portion and the like are not limited to them, but they may be variously combined so as to be executed. In any case, it is possible to achieve the excellent effect of the present invention without damaging as long as it does not depart from the purpose of the present invention.

The description of the embodiment in accordance with the present invention is finished above, however, it goes without saying that the scope of the present invention is not limited only to the details which are illustrated or described.

INDUSTRIAL APPLICABILITY

Since the present invention relates to the automotive supplementary sun visor and the supplementary sun visor, it can be utilized in an industry which manufactures all the motor vehicles such as a truck vehicle and the like without being limited to a passenger car.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An automotive sun visor, comprising:
    a shade plate having an upper edge, a lower edge and a central portion there between and configured to compensate a space between right and left sun visors within a passenger room of an automobile, and formed by a raw material which has a flexibility;
    at least one locking portion perforated in the central portion of the shade plate to correspond to a support shaft of a rearview mirror of the automobile; and
    one incision-like slit running from the upper edge of the shade plate toward the locking portion,
    wherein the shade plate is structured such that it is removably attachable to the support shaft of the rearview mirror by using the slit, locking portion and flexibility of the shade plate itself but no other attaching parts.

2. The automotive sun visor of claim 1, wherein the shade plate is formed by a semitransparent coloring material configured to reduce the amount of sunlight passing through the sun visor.

3. The automotive sun visor of claim 1, wherein the shade plate is formed by a transparent material having a polarization pattern configured to reduce the amount of sunlight passing through the sun visor.

4. The automotive sun visor of claim 1, wherein the shade plate is formed by a transparent material having a picture print pattern configured to reduce the amount of sunlight passing through the sun visor.

5. The automotive sun visor of claim 1, wherein the locking portion is an aperture having a width wider than the incision-like slit.

6. The automotive sun visor of claim 1, further comprising a second locking portion offset from the first locking portion and positioned on the incision-like slit, the second locking portion being wider than the incision-like slit.

7. An automotive sun visor, characterized by
a shade plate formed in such a shape as to compensate between right and left sun visors which are equipped within a passenger room of an automobile, having an appropriate flexibility, and made of a transparent or semitransparent raw material;
a incision-like slit which has an appropriate length, provided from an upper edge of the shade plate toward a center portion;
a locking portion which can be fitted to an attaching support shaft portion of a rearview mirror arranged in an inner end side of the slit;
several kinds of ornamental sheets which have approximately the same shape as the shade plate, form a slit and a locking portion in the same manner, and are applied with a color and a pattern by which a light blocking or dimming effect can be obtained,
wherein an upper side edge releasing-type shade plate body is constructed by the shade plate, making the sheets replaceable and storable one by one in the shade plate body, and structuring the shade plate body such that the shade plate body is detachable with respect to the attaching support shaft portion of the rearview mirror via the slit by using flexibility of the shade plate itself but no other attaching parts, while storing at least one selected ornamental sheet in the shade plate body.

8. The automotive sun visor of claim 7, characterized in that the shade plate body is structured by forming an accommodating portion of the ornamental sheet by laminating two shade plates of the same shape which are provided with a slit and a locking portion.

9. The automotive sun visor of claim 7, characterized in forming an accommodating portion of the ornamental sheet by folding the shade plate which arranges two sets of slits and locking portions in a line symmetric manner and is made of a single raw material, at a line symmetrical axis.

* * * * *